United States Patent [19]
Coutin

[11] 3,871,604
[45] Mar. 18, 1975

[54] RETRACTABLE JETTISONING EJECTOR FOR AIRCRAFTS

[76] Inventor: Pierre Fernand Coutin, 117 avenue du General Michel Bizot, 75012 Paris, France

[22] Filed: Oct. 26, 1973

[21] Appl. No.: 410,231

[30] Foreign Application Priority Data
Nov. 2, 1972  France .............................. 72.38748

[52] U.S. Cl. .......................................... 244/137 R
[51] Int. Cl. ...................... B64d 1/02, B64d 37/12
[58] Field of Search ..... 244/137 R; 89/1.5 R, 1.5 F; 91/416, 401, 399, 422, 441

[56] References Cited
UNITED STATES PATENTS

| | | | |
|---|---|---|---|
| 2,233,521 | 3/1941 | Ernst et al. | 91/401 |
| 2,730,401 | 1/1956 | Rea | 91/441 |
| 2,746,425 | 5/1956 | Schafer | 91/416 |
| 2,931,341 | 5/1960 | Meadows et al. | 244/137 R |
| 3,056,623 | 10/1962 | Herbert | 89/1.5 F |
| 3,229,589 | 1/1966 | Langas | 91/416 |
| 3,557,550 | 1/1971 | Legarra | 91/416 |
| 3,756,545 | 9/1973 | Coutin | 244/137 R |

Primary Examiner—Trygve M. Blix
Assistant Examiner—Galen L. Barefoot
Attorney, Agent, or Firm—Ulle C. Linton

[57] ABSTRACT

This retractable ejector device for jettisoning loads from an aircraft comprises a non-return valve for storing gas under the maximum pressure until the telescopic piston has completed its operative stroke, the gas being then released from a reserve chamber to retract the piston.

1 Claim, 3 Drawing Figures 3,871,604

RETRACTABLE JETTISONING EJECTOR FOR AIRCRAFTS

BACKGROUND OF THE INVENTION

This invention is concerned with a retractable ejector to be mounted on an aircraft for jettisoning a load, notably for releasing bombs, which comprises an ejection piston actuated by gaseous pressure and adapted to be returned to its retracted position by a reserve of this gas under pressure.

REFERENCE TO THE PRIOR ART

The device disclosed in the U.S. Pat. No. 3,756,545 is characterised in that the ejection piston is hollow and incorporates a tubular slide-valve distributor closed at its lower end and provided near this end with passages whereby its inner space can communicate either with an annular gas reserve chamber between the ejection piston and the slide-valve distributor or with the atmosphere in the partially extracted position of said distributor in which said annular chamber is caused to communicate with bottom of the upper fluid-tight portion of said ejection piston, so that this piston is raised by the pressure obtaining in said annular chamber.

The device is applicable to a telescopic ejection piston and in this case the annular chamber in which the reserve of gas under pressure is stored is formed internally of the inner telescopic element positioned at the end of the ejection piston in the fully extended position.

The longer the piston stroke and the greater the frictional contact developed by the piston, the greater the amount of power necessary for retracting the piston, whether single or telescopic, from its outermost or fully extended position. The power necessary for overcoming the frictional contact, in fact, depends on the transverse aerodynamic action of the aircraft. Therefore, in certain cases a suitable amount of gas must be taken and kept in reserve under a maximum pressure so as to correspond to a likewise maximum power available for a subsequent retraction of the piston.

In an arrangement comprising such an annular reserve chamber communicating freely with the thrust chamber located behind or above the piston until the latter is in its outermost or fully extended position, as described in the U.S. Pat. No. 3,756,545, the pressure in this reserve chamber is liable to attain a maximum value and then decrease with the pressure in the thrust chamber due to the volumetric increment of this last-mentioned chamber during the outward or operative movement of the piston in case this increment were not balanced by a sufficient protraction of the supply of gas under pressure thereto. In this case, when the slide valve distributor has been extended only a pressure lower than the maximum pressure produced in the reserve chamber during the piston extension or outward stroke is available for retracting this piston.

SUMMARY OF THE INVENTION

It is the primary object of the present invention to avoid this serious inconvenience by providing, upstream of the passage connecting the inner space of the tubular slide-valve to the reserve chamber, means acting like a non-return valve whereby the gas can flow only from said inner space to said reserve chamber.

According to a preferred form of embodiment of the present invention, this non-return valve consists of a ball or equivalent valve member disposed below a seat formed within the tubular slide-valve distributor upstream of the passage provided through this slide-valve for supplying gas under pressure to said reserve chamber; thus, the ball or like valve member will tend to close the passage through its seat when the pressure behind the ejection piston tends to drop below its maximum value which is thus preserved in the reserve chamber. Moreover, the closing movement of the ball or other equivalent valve member is facilited by the inertia of this member which tends to recede inside the slide-valve during the downward movement of the piston and slide-valve assembly.

DESCRIPTION OF THE PREFERRED EMBODIMENT

Figure 1:
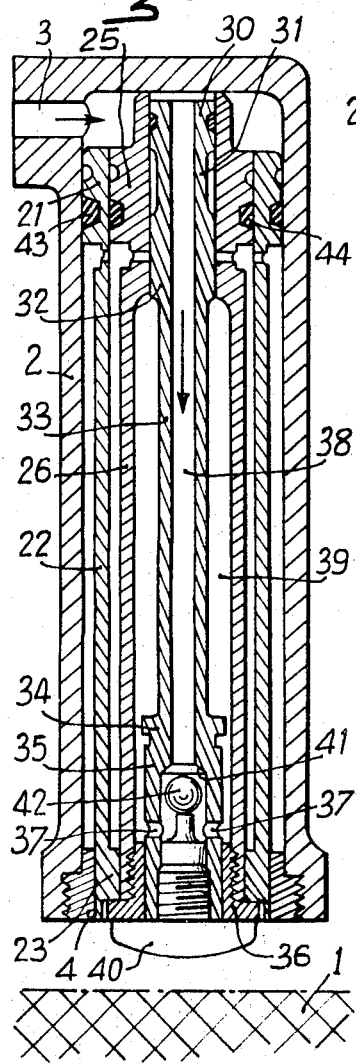
FIG. 1 is an axial section showing the ejection piston in its initial or retracted position.

Referring to the drawing, it will be seen that the jettisoning ejector illustrated therein is in the whole similar to that described in the U.S. Pat. No. 3,756,545 with reference to FIGS. 5 to 10 thereof. In the drawing attached hereto equivalent or corresponding elements are designated with the same reference numerals as in the U.S. Pat. No. 3,756,545 to which reference may be made for a complete understanding. The attached FIGS. 1, 2 and 3 correspond in fact to FIGS. 5, 7 and 8 of said U.S. Pat. No. 3,756,545 and the load to be jettisoned is also designated by the reference numeral 1.

The cylinder 2 of the ejector comprises at its top an inlet port 3 for the pressure gas and has slidably fitted therein a two-section telescopic piston. The outer section 21, 22, 23 of this piston is adapted to slide in the cylinder bore and to abut with its upper element 21 at the end of its outward or operative stroke against the abutment ring 4 carried by the bottom of cylinder 2. Slidably fitted in this outer section 21–23 is the inner section 25, 26 adapted, at the end of its outward stroke to abut against an inner shoulder formed at the lower end of the outer section element 23. Inside the inner section 25, 26 is the tubular slide-valve 30 –35 of which the inner cavity 38 is closed by a screw plug 40. The lower element 35 of this valve is slidably fitted in a bore of the lower telescopic section 25, 26 and this element 35 has formed therein radial passages 37 through which, as long as the slide-valve does not project from the ejector piston, provide a fluid communication between the annular cavity 39 between the slide-valve distributor and the body 26 of the inner telescopic section.

Figure 2:
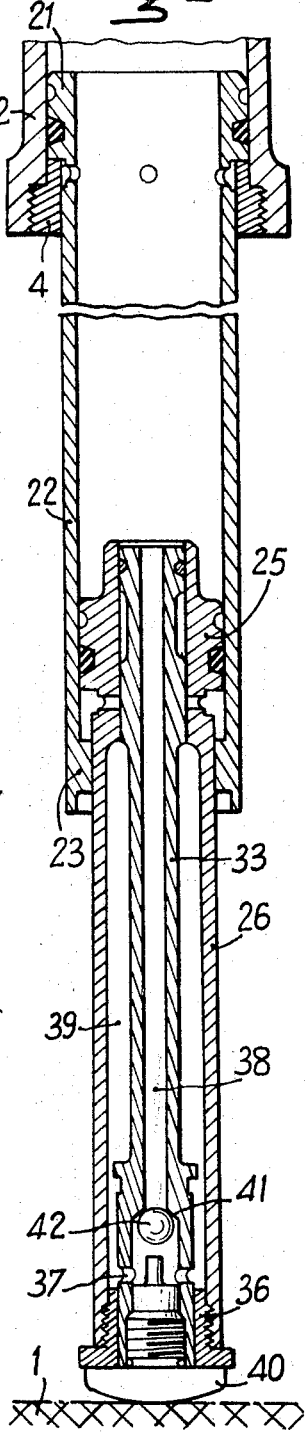
FIG. 2 is a similar axial section with parts broken away showing the ejection piston having nearly complete its operative stroke, the non-return valve being closed to trap gas under the maximum pressure in the reserve chamber.
Figure 3:
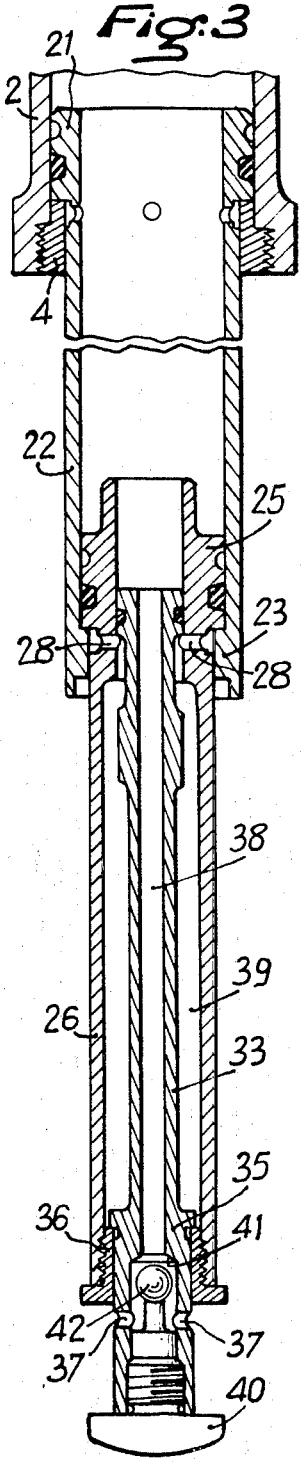
FIG. 3 shows the piston in its outermost or fully extended position, after the outward movement of the slide-valve distributor permitting the backward movement of the ejection piston to its fully retracted position.

The above-described component elements are described more in detail in the aforesaid prior U.S. Pat. No. 3,756,545 and the assembly operates substantially like the assembly described in said U.S. Pat. No. 3,756,545. However, upstream of said radial passages 37 a valve seat 41 is formed in the end element 35 of the slide-valve, and below this seat 41 a ball 42 is adapted to move lightly for engaging said seat 41 and thus isolate the chamber 39 when the gas pressure in the slide valve distributor tends to assume a value lower than that existing in said chamber 39 (FIG. 2).

From the foregoing it is clear that gas under maximum pressure is trapped in chamber 39 and that this gas will be available for retracting the piston as explained in said U.S. Pat. No. 3,756,545 that is, when the outward movement of the slide valve distributor has caused on the one hand the exhaust to the atmosphere, through said radial passages 37, of the pressure gas stored behind the piston (FIG. 3) and on the other hand the uncovering of the upper radial passages 28 for directing the gas pressure from beneath against the head 25 of the piston body 26.

When the inner section and subsequently the outer section of the telescopic piston are both fully retracted, this position can be maintained by either suitable detent-positioning or locking means (not shown) or by the simple adherence of elastic seals 43 and 44 carried by the outer surfaces of the upper elements 21 to 25 of the two sections of said telescopic piston.

What I claim is:

1. A retractable ejector device for jettisoning a load from an aircraft comprising a cylinder having an inlet port at one end and a restricted open end, a two section telescopic piston positioned in and spaced from said cylinder, each section of said piston having a hollow interior open at both ends of said piston, a first section of said piston having a head at its inner end portion, slideable in said cylinder and of a greater diameter than said cylinder restricted open end, a restriction in the hollow interior of said first section, at least one port through the inner end portion of said first section, a second section of said piston having a head at its inner end portion, slideable in said first section and of a greater diameter tham said restricted interior of said first section, a restriction in the hollow interior of said second section and at least one port through the inner end portion of said second section, a tubular distributor positioned in and spaced from said second section hollow interior, having a head at its inner end slideable in said second section, an exterior recess in said tubular distributor head, a flange at its other end portion of greater diameter than said second section restriction, a chamber at the lower portion of said tubular distributor, means closing said chamber at its outer end, a valve seat formed at the upper end of this chamber, a ball in said chamber maintained in the vicinity of said valve seat by said closing means, ports in said chamber disposed under said flange and connecting said chamber to the hollow interior of said second section in a retracted position of said distrubutor while said ports connect said chamber to the atmosphere in an extended position of said distributor, said ball being removed from said valve seat when gas pressure in said tubular distributor is higher than the gas pressure in said hollow second section, and said ball being forced against said valve seat as soon as the gas pressure in said hollow second section becomes higher than the gas pressure in said hollow distributor.

* * * * *